United States Patent [19]
Carroll

[11] 3,778,759
[45] Dec. 11, 1973

[54] STATIC FILTER FOR LONG LINE DATA SYSTEMS

[75] Inventor: Paul E. Carroll, Houston, Tex.

[73] Assignee: Texas Instruments Incorporated, Dallas, Tex.

[22] Filed: Dec. 27, 1971

[21] Appl. No.: 212,606

[52] U.S. Cl. .......... 340/15.5 F, 333/12, 340/15.5 R
[51] Int. Cl. ..................... H04b 3/28, G01v 1/22
[58] Field of Search .................. 333/12; 340/15.5 F; 178/69 B

[56] References Cited
UNITED STATES PATENTS

| | | | |
|---|---|---|---|
| 2,280,950 | 4/1942 | Harder | 333/12 |
| 3,223,920 | 12/1965 | Sasaki | 333/12 |
| 2,733,412 | 1/1956 | Alexander et al. | 333/12 |
| 3,493,900 | 2/1970 | Cushing | 333/12 |
| 2,748,202 | 5/1956 | McCallister et al. | 333/12 |
| 3,516,026 | 6/1970 | Curran et al. | 333/12 |

Primary Examiner—Benjamin A. Borchelt
Assistant Examiner—H. A. Birmiel
Attorney—Harold Levine et al.

[57] ABSTRACT

A data system having data communication over a pair of electrical conductors includes a filter for eliminating static noise of atmospheric origin. In a specific embodiment, a system for acquiring seismic data includes a static filter for attenuating a common mode signal and atmospheric noise while preserving desired difference mode data. A specific embodiment of the filter includes a pair of input inductors having a piar of series connected capacitors and a pair of series connected resistors in parallel and connected across the conductors, with the nodes between the two capacitors and two resistors being connected to a common reference potential. The inductors are wound on the same core to effectively cancel the inductance presented to the difference mode signal.

9 Claims, 5 Drawing Figures

STATIC FILTER FOR LONG LINE DATA SYSTEMS

This invention relates generally to elimination of common mode atmospheric noise pickup in long line data systems, and more particularly to such noise elimination in seismic data acquisition systems.

According to a general method of seismic exploration, a seismic disturbance is generated at or near the surface of the earth. Seismic waves are thus generated and transmitted through the earth, and are detected at various locations by seismic transducers, commonly called geophones or seismometers. The electrical signal output of a group of seismic transducers is typically coupled by a pair of electrical conductors, such as wire lines, to a centrally located seismic data acquisition system for conversion to and storage in digital form, subsequently to be processed in a digital data processing system.

The electrical signal output of a seismic transducer is a difference mode signal. The common mode signal, which is picked up by the wire lines from atmospheric disturbances, is the voltage potential common to both wire lines. The difference mode signal is the difference voltage potential between the two lines. The difference mode signal contains the desired seismic data, but is of much less magnitude than the common mode signal. For example, the common signal my be a few volts whereas the difference mode signal may be only a few microvolts. An input amplifier of the data acquisition system will somewhat suppress the common mode signal. Also, the signals may be transformer coupled into the data acquisition system to provide additional low frequency common mode rejection. However, effective filtering of atmospheric noise without attenuating the desired difference mode signal has been difficult to achieve.

In recent years the practice has developed of placing seismic transducers at significant distances from the data acquisition system, requiring connecting lines of up to a mile and more in length. This practice has compounded the noise problem in seismic data acquisition. The long wire lines tend to serve as antennas to pick up electrical static from distant atmospheric disturbances, such as thunder storms. The wire lines also pick up static from near thunder storms and from impact of wind blown particles, such as sand and snow. Such noise pickup may degrade the signal to noise ratio of the signals on the lines to such an extent as to render the data unusable. As a result, many man and equipment hours required for setting up a seismic shot may be lost, and may later have to be duplicated at considerable expense.

Accordingly, the present invention comprises a filter, and a seismic data acquisition system including such a filter, for attenuating static noise without significantly attenuating or otherwise impairing the desired difference mode data.

It is a primary object of this invention to provide a filter for attenuating system noise of atmospheric origin in long line data systems.

It is another object of the invention to provide a filter for attenuating a common mode signal and system noise of atmospheric origin while preserving difference mode data in seismic data acquisition systems.

Additional objects and advantages of the invention will become apparent from the following detailed description in conjunction with the drawings, in which.

Figure 1:
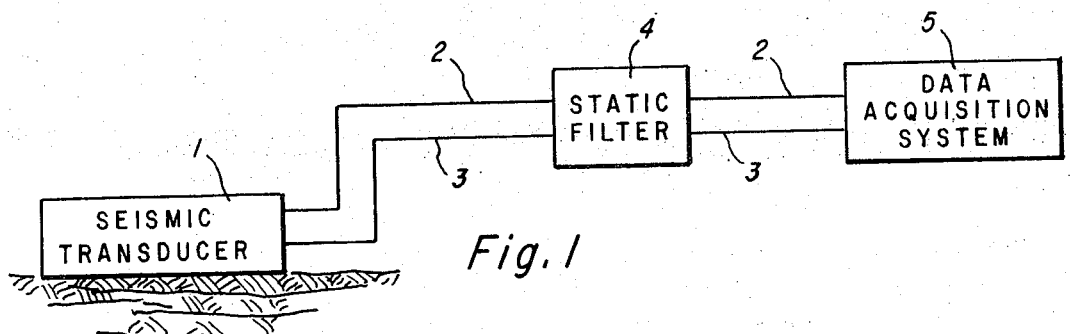
FIG. 1 is a general block diagram of a seismic data acquisition system including the filter of this invention.

Referring now to the drawings, a general block diagram of a basic embodiment of this invention is illustrated in FIG. 1. The seismic transducer 1 detects seismic waves created by a seismic disturbance, e.g., an explosion of dynamite, and produces analog electrical signals to be carried over wire lines 2 and 3 to data acquisition system 5. In data acquisition system 5 the analog seismic data is converted to digital data and stored, subsequently to be processed in a data processing system. A static filter 4 is coupled between the seismic transducer 1 and data acquisition system 5. The static filter 4 filters out static noise while preserving the detected seismic data. The seismic transducer 1 may be one of the various well known and commercially available types, for example, an Electro-Technical Labs Model EV20 or Geo Space Model GSC20–D. A suitable seismic data acquisition system 5 is described in U.S. Pat. No. 3,134,957 by Robert S. Foote et al. and assigned to Texas Instruments Incorporated, as well as Models DFS-III and DFS-IV currently manufactured by Texas Instruments Incorporated.

Long data communication lines, such as lines 2 and 3 of FIG. 1, which are exposed to the elements tend to pick up atmospheric disturbances and generate noise pulses, thus deteriorating the signal to noise ratio of the signals on the lines. Experimentation and analysis has led to the conclusion that the noise is of three basic forms, all having a broad spectrum including some very low frequency components. One source of atmospheric noise is distant thunder storms, which are picked up like an antenna by the data lines. Noise from this source produces a damped sinusoidal pulse or a differentiated pulse, dependent on line Q. This noise is particularly troublesome, since the thunder storms may be so far away that the seismic crew will not know of their existence, yet there may be sufficient pickup to substantially impart the seismic data. Noise pickup from more near thunder storms tends to produce a differentiated pulse, also somewhat dependent on line Q. A third source of atmospheric noise is voltage buildup and resulting breakdown and discharge resulting from impact with particulate matter, such as wind blown sand or snow. Noise of this latter type may be eliminated by providing a DC path from each wire to ground, but effective filtering is required to eliminate the static noise pickup from thunder storms.

The pulses created by thunderstorms may be several volts in amplitude and have been determined to be predominately common mode in nature. Resulting problems are most significant at high gains when the useful difference mode signal is on the order of a few microvolts. The combined common mode rejection of the desired filter and input amplifier of the seismic data acquisition system should be about 100 db at 30 kHz for desired performance. Added resistance should not exceed 50 ohms per line and capacity to ground should not exceed about 0.1 μf to prevent creation of phase differences between the signals on the respective lines.

Figure 2:
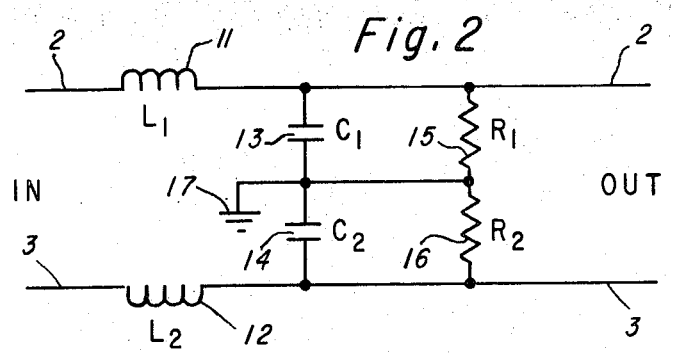
FIG. 2 is a schematic diagram of a basic filter unit of this invention.

A schematic diagram of a static filter is illustrated in FIG. 2. The common mode signal is carried on both lines 2 and 3, whereas the difference mode signal is the difference potential therebetween. The filter suppresses the common mode signal and static noise while preserving the difference mode signal. The electrical signals enter the filter through equal inductors 11 and 12. Series connected capacitors 13 and 14 are connected across the two lines. Similarly, series connected resistors 15 and 16 are connected across the two lines. The node between the resistors 15 and 16 is connected to the node between the capacitors 13 and 14, with the common node formed thereby connected to a reference potential 17. In one specific embodiment wherein $C_1 = C_2 = 0.1$ μf, $L_1 = L_2 = 24$ h and $R_1 = R_2 = 5.1$ kΩ, the filter provides an LR cutoff frequency of about 33 Hz and an LC cutoff frequency of about 320 Hz, and about 100 db of attenuation at 32 kHz (neglecting distributed capacity in the inductors). The resistors hold the Q to less than 0.6 at resonance and provide a d.c. path to ground (or other reference). The d.c. path to ground for each wire effectively eliminates the interference effects of sand, snow and other wind blown particles. However, this filter also attenuates the desired difference mode data as well as the common mode signal and noise.

Figure 3:
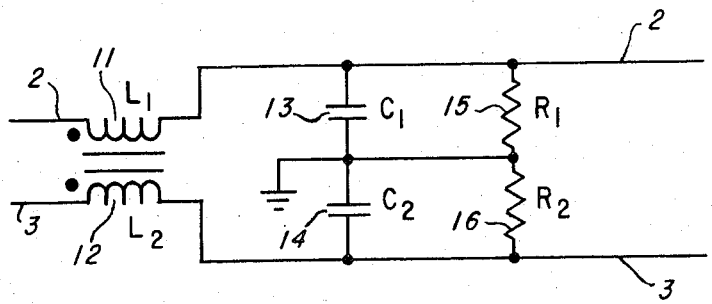
FIG. 3 is a schematic diagram of the single channel filter unit of FIG. 2 illustrating coupling between the input inductors.
Figure 4:
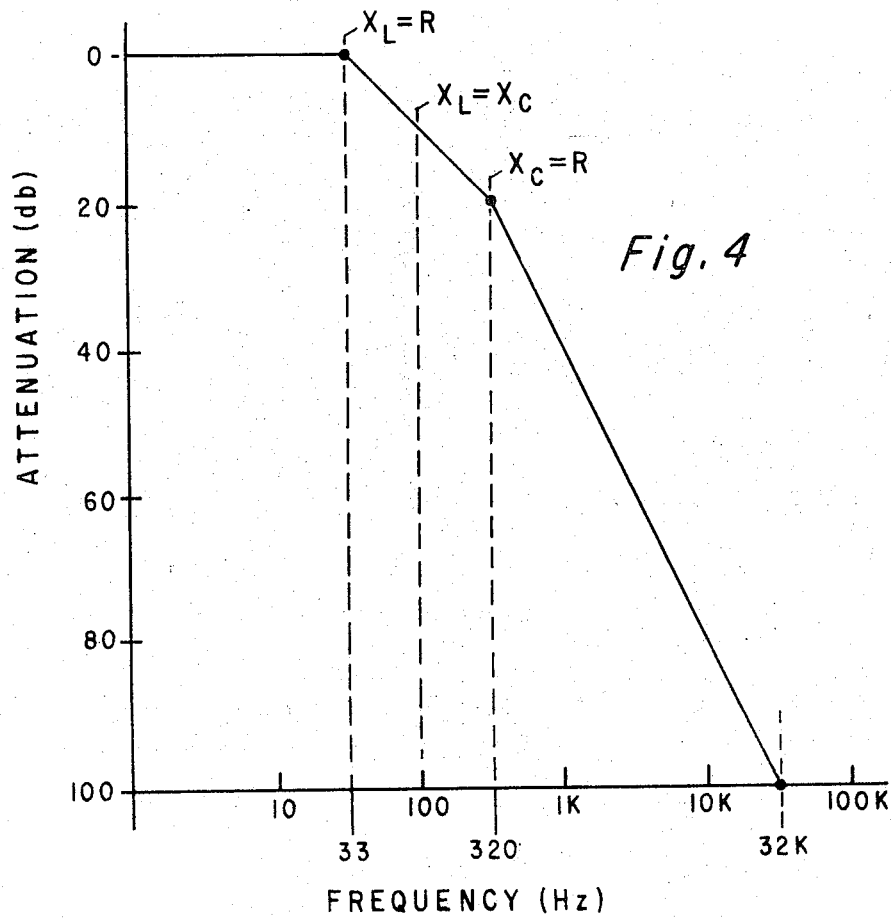
FIG. 4 is a plot of the frequency response of a specific embodiment of the filter of FIG. 3.

The static filter of FIG. 3 is identical to the filter of FIG. 2, except for the illustrated coupling between inductors 11 and 12. This may be achieved, for example, by winding both inductors 11 and 12 on the same core. Thus the inductance presented to the common mode signals is the same as for the filter of FIG. 2, but the inductors 11 and 12 of FIG. 3 cancel each other as to the difference mode signal, thus eliminating difference mode filtering. This filter very effectively attenuates the common mode signal and static noise while leaving the difference mode signal unimpaired. The filter has the same frequency response as the filter of FIG. 2, with the exception that only common mode signals are affected. A plot of the frequency response is illustrated in FIG. 4, wherein the abscissa is common mode frequency and the ordinate represents attenuation in decibels. The filter frequency of FIG. 3 is effectively a sharp cutoff common mode low pass filter. A practical disadvantage yet remains as to the large physical size of the inductors, which are 24 henrys nominal inductance in a specific embodiment.

Figure 5:
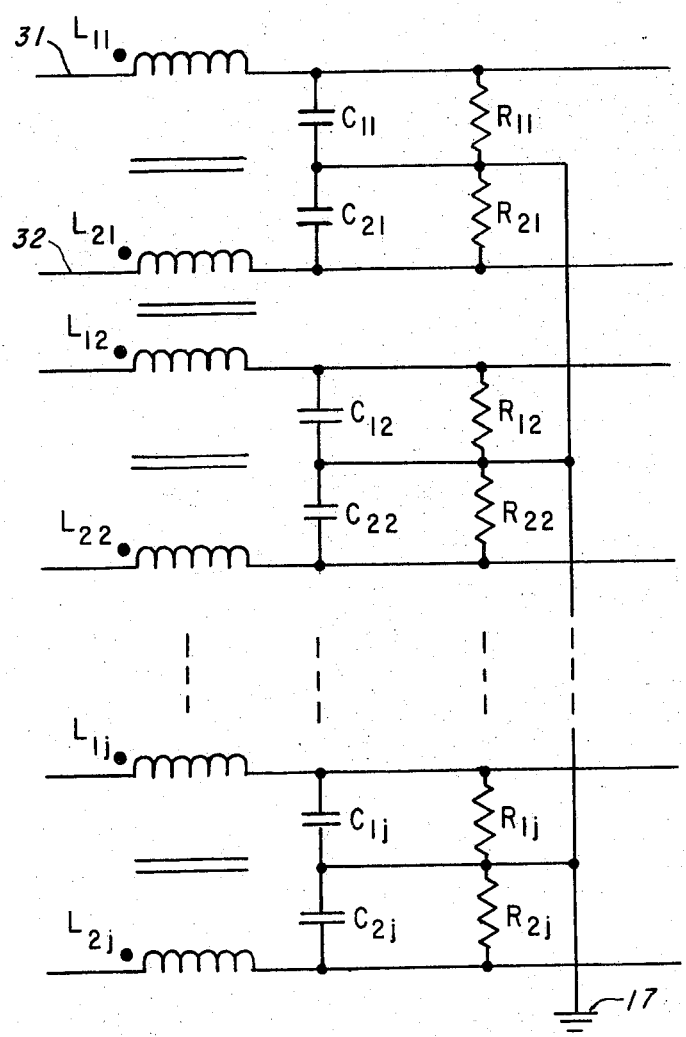
FIG. 5 is a schematic diagram of a multi-channel filter for a seismic data acquisition system.

A multi-channel filter for a seismic data acquisition system is schematically illustrated in FIG. 5. The multi-channel filter is comprised of a plurality of basic units, one for each channel, of the type illustrated in FIG. 2. The nodes between the capacitor pairs $C_{11} - C_{21}$ through $C_{1j} - c_{2j}$, wherein there are $j$ channels, are connected to common reference potential 17. The input inductors of each filter channel are connected by a pair of electrical conductors to a seismic transducer, and the output of each filter is connected by a pair of electrical conductors (typically quite short) to a particular channel of the data acquisition system. All the inductors $L_{11} - L_{1j}$ and $L_{21} - L_{2j}$ may be wound on the same core to effectively cancel the inductance presented to the difference mode signal, thereby eliminating difference mode filtering. Since there are now $2j$ resistors connected in parallel, the effective resistance presented to each channel is $R/2j$, wherein $R$ will be of the same nominal resistance (e.g., 5.1K) as the resistors of the filter of FIG. 3 for the same filtering effect. Similarly, since there are now $2j$ capacitors connected in parallel, the effective capacitance presented to each channel is $2jC$, wherein C is of the same nominal capacitance (e.g., 0.1μF) as the capacitors of the filter of FIG. 3 for the same filtering effect. This enables the inductors to be reduced in nominal value by a factor of $1/(2j)$ and yet retain the same LR and LC cutoffs. In a 12 channel filter the required inductors would, e.g., be only 1 henry, as compared to the 24 henry inductors required for the single channel unit of FIG. 3, for the same filtering effect.

The description herein with reference to specific embodiments of the invention is intended to be only illustrative of the principles disclosed.

What is claimed is:

1. In a system for acquiring seismic data of the type wherein at least one seismic transducer is responsive to a seismic disturbance to produce a difference mode electrical signal to be coupled by a pair of wire lines to a seismic data acquisition system, and wherein a common mode signal may be picked up by said lines from atmospheric disturbances, filter means coupled between said seismic transducer and said data acquisition system for attenuating said common mode signal and noise without significantly attenuating said difference mode signal, wherein said filter means is comprised as follows:
   a. a pair of magnetically coupled input inductors one connected to each wire line;
   b. following said inductors a pair of series connected capacitors connected across said wire lines;
   c. a pair of series connected resistors connected across said wire lines in parallel with said pair of capacitors; and
   d. means for connecting a node between said capacitors and a node between said resistors to a common reference potential.

2. The system of claim 1 wherein said pair of inductors are wound on the same core.

3. The system of claim 1 wherein said inductors are of equal inductance, said capacitors are of equal capacitance and said resistors are of equal resistance.

4. The system of claim 1 wherein said filter means is a multi-channel filter comprised as follows:
   a. a plurality of magnetically coupled inductors, one series connected with each wire line in said cable;
   b. following said inductors, a pair of series connected capacitors connected across each pair of wire lines;
   c. a pair of series connected resistors connected across each pair of wire lines in parallel with said capacitors; and
   d. means for connecting a node between each pair of capacitors and a node between each pair of resistors to a common reference potential.

5. The system of claim 4 wherein all of said inductors are wound on the same core.

6. The system of claim 4 wherein all of said inductors are of equal inductance, all of said capacitors are of equal capacitance and all of said resistors are of equal resistance.

7. A filter for use in attenuating common mode signals carried by pairs of electrical conductors in a multi-conductor cable, comprising:
   a. a plurality of magnetically coupled inductors, one connected to each electrical conductor;

b. a plurality of pairs of series connected capacitors, one pair electrically connected across each pair of electrical conductors subsequent to said inductors;

c. a plurality of pairs of series connected resistors, one pair electrically connected across each pair of electrical conductors and in parallel with a pair of capacitors; and d. means for connecting a node between each pair of capacitors and a node between each pair of resistors to a common reference potential.

8. The filter of claim 7 wherein said inductors are of equal inductance, said capacitors are of equal capacitance, and said resistors are of equal resistance.

9. The filter of claim 8 wherein all of said inductors are wound on a common core.

* * * * *